3,052,529
STABILIZED HYDROCARBON FUELS
AND LUBRICANTS
Sigurd O. Rue, Birmingham, Mich., assignor to Ethyl Corporation, New York, N.Y., a corporation of Delaware
No Drawing. Original application May 28, 1953, Ser. No. 358,195, now Patent No. 2,862,014, dated Nov. 25, 1958. Divided and this application Mar. 31, 1958, Ser. No. 724,824
6 Claims. (Cl. 44—66)

This invention relates to a new class or organic material. More particularly, the present invention relates to a novel class of metallic monobasic acid compounds of particular utility as additives to hydrocarbons.

It has been known heretofore that the addition of metallic soaps to various hydrocarbon compositions results in an improvement of their properties and thereby enhances their utility. For example, lubricating oils and in particular heavy duty lubricating oils when treated with metallic soaps possess improved performance qualities by virtue of the detergent properties of these materials. Likewise, distillate fuels such as bunker and other burner fuel oils and diesel fuels which deteriorate in the presence of oxygen with the formation of sludge, gums, and other sediments giving rise to clogging or plugging of filters, strainers, screens, conduits, injectors and the like have been improved to some extent by incorporating therein such metallic soaps. If it were not for the accumulation of water in such hydrocarbons metallic soaps known heretofore would undoubtedly be entirely satisfactory for this purpose. However, the phase distribution characteristics of known metallic soaps are such that in water-containing hydrocarbons the soaps tend either to dissolve extensively in the water phase or hydrolyze readily such that emulsification and/or sludge formation frequently occur.

It has now been found that a new class of basic hydrates of metallic monobasic acid compounds can be prepared which possesses both the proper phase distribution characteristics and resistance to hydrolysis. That is to say, the materials of the present invention are readily soluble in hydrocarbons, practically insoluble in water and resistant to hydrolysis. As a result of this discovery, the benefits of the presence of the materials of this invention in the hydrocarbon phase become apparent since such materials are essentially water insensitive.

It is, therefore, an object of the present invention to provide as new compositions of matter a class of compounds of particular utility as additives to hydrocarbon compositions. Likewise, it is an object of this invention to provide processes for the preparation of these new compositions of matter. In addition, it is an object of this invention to provide hydrocarbon compositions which in the presence of water do not deteriorate with the attendant formation of emulsions and/or sludge. Other important objects of the instant invention will become still further apparent from the discussion hereinafter.

It has now been found that the above and other objects of this invention are accomplished by providing as new compositions of matter a class of basic hydrates of metallic monobasic acid compounds. The materials of the present invention are basic hydrates of polyvalent metallic materials derived from monobasic acids capable of forming hydrates. Thus, the new compositions of matter of the present invention correspond empirically to the general formula $$RCOOMOH \cdot H_2O$$

wherein R is the organic residue of a monobasic acid as further described hereinafter and M is a divalent metal normally capable of forming salts or soaps with fatty acids. Thus, the metallic constituent of the compounds of the present invention is a divalent metal selected from the group of the periodic table consisting of group II, group IV, and group V. Therefore, the metals of the compounds of this invention are exemplified by magnesium, calcium, strontium, barium, zinc, cadmium, mercury, tin, lead, and vanadium as vanadyl. In accordance with the above general formula the basic hydrates of metallic monobasic acid compounds of the present invention are compounds derived from monobasic acids which can be saturated or unsaturated open chain monobasic acids or cyclic monobasic acids. Therefore, the basic hydrates of metallic monobasic acid compounds of the instant invention can be prepared from such acids as lauric, myristic, palmitic, stearic, arachidic, eicosanecarboxylic, behenic, lignoceric, cerotic, melissic, psyllastearic, naphthenic, oleic, erucic, elaidic, ricinoleic, brassidic, tiglic, citronellic, undecylenic, geranic, linoleic, dehydrogeranic, linolenic, and like acids.

The preferred materials of the present invention are basic hydrates of metallic monobasic straight chain unsaturated acids containing from about 10 to 30 carbon atoms per molecule. Likewise, the preferred metallic constituent of the new compositions of matter of the present invention is magnesium.

To better understand the nature of the present invention an illustrative material, magnesium oleate, is considered in detail.

It has been found that fatty acid derivatives of metals of the character described hereinbefore are capable of existing in a number of chemical forms. For example, magnesium oleate can exist in at least four states of aggregation as follows:

(1) Anhydrous magnesium oleate
(2) Magnesium oleate dihydrate
(3) Partially hydroxylated hydrate of magnesium oleate
(4) Basic hydrate of magnesium oleate The fact that such materials can exist in these diverse states of aggregation is of extreme importance in their effective utilization. The present invention is concerned with compounds of the type illustrated by the basic hydrate of magnesium oleate, which compounds are particularly useful in the improvement of hydrocarbons, and in particular hydrocarbons of the type exemplified by lubricating oils and distillate fuel.

The general method for the preparation of the compounds of the present invention consists of reacting in aqueous solution an alkali metal salt of a monobasic acid with a salt of the desired metal, preferably a halide salt. Generally speaking, it is preferable to conduct this reaction at a temperature between about 30° C. and about 80° C. Under these conditions the desired compound of the present invention is formed as a precipitate which then can be separated from its preparative environment by conventional means. The following example wherein all parts and percentages are by weight further illustrates the general method for the preparation of the compounds of the present invention.

EXAMPLE

To 15.2 parts (0.05 mole) of sodium oleate dissolved in 300 parts of water was added a solution of 10.2 parts (0.05 mole) of magnesium chloride hexahydrate in 100 parts of water. Concurrently a solution of 2 parts (0.05 mole) of sodium hydroxide in 50 parts of water was added to the above solution. The temperature of the reaction mixture was thus in the order of about 50° C. and under these conditions a white precipitate formed which was removed by filtration, washed with cold water and dried under 2 to 3 millimeters of vacuum at 60° C. for eight hours. It was found that 12 parts of the basic hydrate of magnesium oleate was formed which, when subjected to chemical analyses, contained 7.13 percent of magnesium and 7.99 percent of hydroxyl ion corresponding very closely to the general formula $Mg(C_{18}H_{33}O_2)OH \cdot H_2O$. Examination of this material by X-ray diffraction showed a strong peak at $2\theta = 19$ to $21°$ and a few diffuse lines.

As indicated previously the compounds of the present invention are unique particularly with regard to their phase distribution characteristics. That is to say, the compounds of the present invention have been found to be readily soluble in hydrocarbon compositions and exceedingly insoluble in water. To further illustrate the facet of the compounds of this invention a series of storage tests was conducted wherein the previously defined types of the illustrative material, magnesium oleate, were blended at low concentration levels in gasoline-water systems. The samples so prepared consisted of 1,000 milliliters of a commercially available hydrocarbon fuel with 100 milliliters of water and the desired amounts of the diverse chemical forms of magnesium oleate. The samples were stored at room temperature and at convenient intervals 15 milliliter samples of the gasoline phase were removed and subjected to spectrographic analyses. The results of these storage tests are presented in the following table:

*Table*

DISTRIBUTION OF MAGNESIUM OLEATES BETWEEN GASOLINE AND WATER

[Magnesium concentrations are shown as lb. Mg oleate/1,000 bbl.]

| Mg oleate in sample | | Mg content of gasoline | | | |
|---|---|---|---|---|---|
| Description | Concn. | 1 wk. | 3 wk. | 7 wk. | 18 wk. |
| Anhydrous | 24 | 12.2 | 2.9 | 2.5 | 0.5 |
| Dihydrate | 28 | 0.4 | 1.8 | 1.3 | 0.8 |
| Dihydrate [1] | 28 | 0.6 | 0.7 | 0.3 | 0.7 |
| Partially hydroxylated hydrate | 31 | 1.2 | 0.6 | 0.5 | 0.7 |
| Basic hydrate | 28 | 16.9 | 16.7 | | |

[1] This sample contained 400 milliliters of water.

Reference to the data presented in the above table indicates that the hydrated polymetallic salts of monobasic acids exemplified by the dihydrate of magnesium oleate possess a relatively high solubility in water as evidenced by their relatively low concentrations in the hydrocarbon phase. The anhydrous forms of the metallic salts of monobasic acids appear to be more soluble in the hydrocarbon phase than the hydrated forms during the initial stages of storage. However, as the data indicate the solubility of the material in the hydrocarbon phase decreases markedly over a relatively short period of time indicating a rather rapid transformation of the anhydrous material to the hydrated form which then apparently is extracted from the hydrocarbon phase because of its preferential solubility in the aqueous phase. The partially hydroxylated hydrates of the metallic monobasic acid compounds illustrated by the partially hydroxylated hydrate of magnesium oleate, in contrast with the above described forms, tends to distribute itself at the liquid-liquid interface, a property which is exceedingly useful in the obviation of corrosion. However, insofar as the present invention is concerned, the most striking effect is that of the basic hydrate which, notwithstanding the presence of a large amount of water in contact with the hydrocarbon phase, possessed an exceedingly high solubility in the hydrocarbon phase. This result is particularly striking when considered in the light of the rather pronounced solubility of the dihydrate forms in the aqueous phase. It will be apparent therefore that the compounds of the present invention being readily soluble in hydrocarbon compositions can be blended therewith in suitable quantities so as to improve the characteristics of the hydrocarbon and further that the resulting improved hydrocarbon compositions will retain their effectiveness notwithstanding subsequent accumulation of water in the system.

In accordance with the present invention improved hydrocarbon compositions are prepared by blending the desired quantity of basic hydrate of a metallic monobasic acid compound in a hydrocarbon the characteristics of which are to be improved. That the compounds of this invention are readily soluble in hydrocarbons in general greatly facilitates this operation. Thus, it is generally sufficient merely to add the necessary quantity of the desired basic hydrate to the hydrocarbon to be improved and by means of shaking, stirring or other methods of agitation, homogeneous hydrocarbon compositions of the present invention are provided. The amounts of the basic hydrates of metallic monobasic acid compounds so employed are contingent upon first the nature of the basic hydrate selected, second, the nature of the hydrocarbon composition to be improved, and third, the ultimate use to which the improved hydrocarbon composition is to be subjected. Generally speaking, however, amounts of such basic hydrates between about 0.0001 and about 2 percent by weight are generally satisfactory although somewhat greater or lesser quantities can be effectively utilized under some circumstances. A variation within the contemplation of the present invention is the preparation of concentrated solutions of one or more basic hydrates of metallic monobasic acid compounds of this invention in a relatively small quantity of the hydrocarbon of the type to be improved. When preparing such concentrated solutions amounts of the basic hydrates of this invention in the order of between about 5 to about 25 percent by weight of the hydrocarbon provide efficacious concentrated solutions. When employing these, it is then sufficient merely to dissolve approximately one pint of the concentrate in up to about 750 gallons of the hydrocarbon to be treated. Another variant of the present invention is to utilize commercially available mutual solubilizing agents such as coal tar fractions, diverse petroleum cuts and the like in lieu of the hydrocarbon per se in the preparation of the above described concentrated solutions for use in the treatment of large quantities of hydrocarbons.

As indicated previously in the preparation of the improved hydrocarbon compositions of the present invention, it is generally necessary only to add the desired quantity of the basic hydrate to the hydrocarbon and insure thorough mixing such that a homogeneous composition is prepared. By way of example, when one part of the basic hydrate of magnesium oleate is added to 1,000 parts of an SAE No. 30 lubricating oil, and the resulting mixture is stirred a homogeneous improved lubricant is provided which possesses all of the qualities normally provided by the presence therein of a normal metallic soap. However, in addition the improved lubricant of the present invention possesses the characteristic of being essentially water-insensitive, a characteristic inherent in the compounds of this invention. Likewise, when 10 parts of the basic hydrate of calcium ricinoleate are added to and intimately mixed with 5,000 parts of a straight run distillate fuel of the diesel fuel boiling range an improved fuel suitable for use in compression ignition engines is provided. Similarly, by blending 2 parts of the basic hydrate of barium linoleate with 2,000 parts of a mixture of straight run and catalytically cracked fuel oils boiling in the range of between about 375 and 650° F. an additional improved hydrocarbon composition of the present invention is prepared. It is found that in each of the above illustrative examples the hydrocarbon treated in accordance with the present invention retains its homogeneity even in the presence of normal amounts of water which are frequently associated with such compositions. By the same token it is found that because of the water insensitivity of the compounds of the present invention the normal tendencies toward sludge and/or emulsion formation are eliminated thereby enhancing the utility of the improved compositions.

Although the characteristics of the compounds of the present invention render them readily adapted for use as additives to hydrocarbon compositions, these compounds likewise are susceptible of other important uses. By way of example the compounds of the present invention can successfully be utilized as water-proofing agents; driers in diverse formulations such as linoleum, paint, varnish and lacquers; ingredients in the formulation of medicinal preparations; and the like. This application is a division of application Ser. No. 358,195, filed May 28, 1953, now Patent 2,862,014.

As many widely different embodiments of the present invention will become apparent to those skilled in the art it is not intended that the present invention be limited to the specific materials illustrated nor the specific applications thereof and thus, that which I consider as my invention is as described in the appended claims.

I claim:

1. A new composition of matter consisting essentially of gasoline and from about 0.0001 to about 25 percent by weight of a basic hydrate of magnesium monobasic acid compounds having the general formula $$RCOOMOH \cdot H_2O$$

wherein R is the organic residue of a straight chain unsaturated monobasic acid containing from about 10 to 30 carbon atoms in the molecule and M is magnesium.

2. A new composition of matter consisting essentially of gasoline and from about 0.0001 to about 25 percent by weight of the basic hydrate of magnesium oleate having the formula $Mg(C_{18}H_{33}O_2)OH \cdot H_2O$.

3. The composition of claim 1 wherein the concentration of $RCOOMOH \cdot H_2O$ is between about five to about 25 percent by weight.

4. The composition of claim 1 wherein the concentration of $RCOOMOH \cdot H_2O$ is between about 0.0001 to about two percent by weight.

5. The composition of claim 2 wherein the concentration of the basic hydrate of magnesium oleate is between about five to about 25 percent by weight.

6. The composition of claim 2 wherein the concentration of the basic hydrate of magnesium oleate is between about 0.0001 to about two percent by weight.

References Cited in the file of this patent

UNITED STATES PATENTS

| | | |
|---|---|---|
| 2,417,431 | McLennan | Mar. 18, 1947 |
| 2,560,986 | Richter | July 17, 1951 |
| 2,695,910 | Asseff et al. | Nov. 30, 1954 |
| 2,798,797 | Shepherd | July 9, 1957 |
| 2,839,470 | Warren et al. | June 17, 1958 |